(No Model.)
W. S. LUND.
HARNESS SADDLE.
No. 496,088. Patented Apr. 25, 1893.
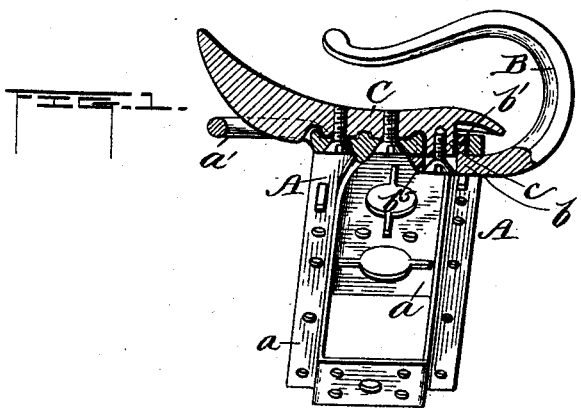
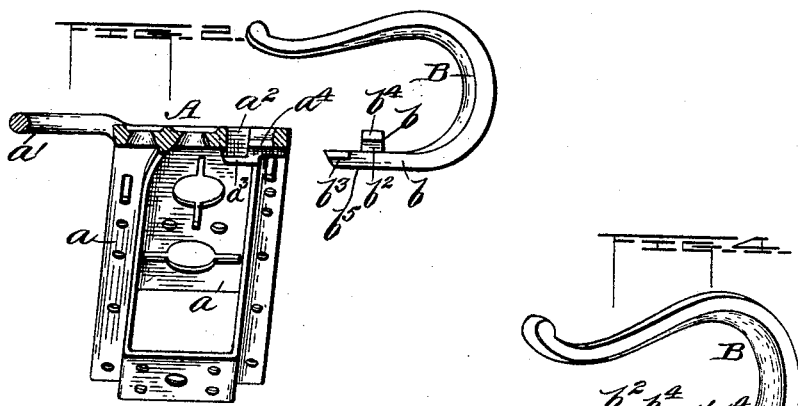
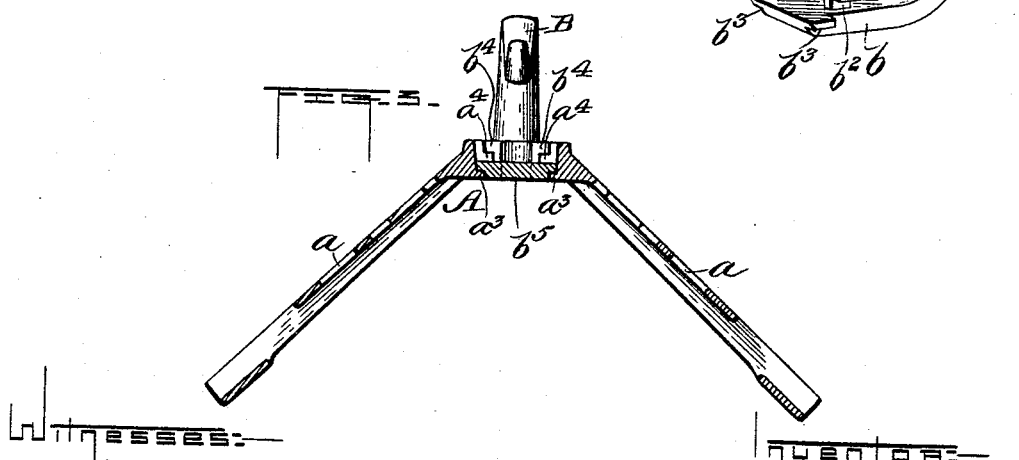

UNITED STATES PATENT OFFICE.

WILLIS S. LUND, OF NASHUA, NEW HAMPSHIRE.

HARNESS-SADDLE.

SPECIFICATION forming part of Letters Patent No. 496,088, dated April 25, 1893.

Application filed January 14, 1893. Serial No. 458,394. (No model.)

*To all whom it may concern:*

Be it known that I, WILLIS S. LUND, a citizen of the United States, residing at Nashua, in the county of Hillsborough and State of New Hampshire, have invented certain new and useful Improvements in Harness Saddles or Trees and Checkrein-Hooks Combined; and I do hereby declare the following to be a full, clear, and exact description of the invention, such as will enable others skilled in the art to which it appertains to make and use the same.

My invention relates to saddle trees and check rein hooks and consists in certain novel constructions and arrangement of parts whereby the check rein hook can be securely fastened in the saddle tree and prevented from working loose and turning in the same, as will be hereinafter described and claimed.

In the accompanying drawings Figure 1 is a side elevation, partly in section, of my improved saddle tree and check rein hook. Fig. 2 is a side elevation, partly in section of the saddle tree, the saddle or seat being removed and the hook disengaged from the saddle tree. Fig. 3 is a vertical transverse section through the saddle tree and check rein hook and Fig. 4 is a perspective view of the hook.

A in the drawings represents the saddle tree, B the check rein hook and C the saddle or seat. The saddle tree is of arch form having a flat approximately horizontal portion at the top of the arch and two inclined wings or pad plates $a$, $a$ and provided centrally of its width with a rearwardly extending back strap attaching portion $a'$. The nearly horizontal flat portion of the arch near its pommel end is formed with a somewhat T shaped passage $a^2$ which on its under side is provided with stepped lugs $a^3$, $a^4$. The larger or head portion of the T shaped passage is formed with the inwardly extending lugs $a^3$, $a^3$ on opposite sides of said passage on its lower edge, and just forward of and a little above these lugs, lugs $a^4$ $a^4$ are formed in the smaller or shank portion of the T shaped passage. On the upper surface of the base portion $b$ of the check rein hook B a short distance from its end an upwardly extending lug $b'$ is formed, which latter is recessed on its sides at $b^2$, $b^2$ to receive and hold the lugs $a^3$ $a^4$, and on the side edges of the base portion $b$ of the hook at its extreme end laterally projecting notches $b^3$ $b^3$ are formed which are about one half the thickness of the base portion of the hook so as to permit said lugs to pass over the notches $a^3$, $a^3$ and firmly hold the hook against downward movement when the hook is engaged with the saddle tree. In securing the hook to the saddle tree, the upwardly extending lug $b'$ is inserted into the head of the T shaped passage from the under side and the hook drawn forward, the grooves or recesses $b^2$ $b^2$ on the sides of the hook receiving the lugs $a^4$ $a^4$ and the lugs $b^3$ $b^3$ of the hook resting on the lugs $a^3$ $a^3$, thereby rendering it impossible to move the hook up or down. It will also be observed that the notches $a^4$ $a^4$ serve as a support for the lugs $b^4$ $b^4$ formed by the grooves or recesses $b^2$ $b^2$ when the check rein hook is in place on the saddle tree. The vertical lug $b'$ on the hook occupies the shank portion of the T passage and the portion $b^5$ of the hook closes the bottom of the head portion of the T shaped passage, a space being left above the portion $b^5$ of the hook for the reception of a lug $c$ on the under side of the pommel portion of the saddle C as shown.

By inserting the lug $c$ of the saddle into the space or recess just described it is impossible to move the hook backward, in fact in any direction as the lugs, notches and sides of the passage prevent the hook being moved in other directions.

The saddle is held in position by screws passed up from the under side of the saddle tree into the same; and the saddle may be still more firmly held in place by perforating the end portion $b^5$ of the hook and providing the lug $c$ of the saddle with a recess and passing a screw from the under side of the tree through said perforation into the recess.

From the aforegoing description it will be seen that all liability of the hook becoming loose and turning is overcome and a very simple, effective and cheap saddle tree, saddle and check rein hook is produced which can be readily secured together and as conveniently separated for the purpose of renewing any of the parts in the event of the same being broken.

What I claim as my invention is—

1. The combination of the saddle tree and check rein hook, the saddle tree provided with an approximately T-shaped vertical passage formed with stepped side holding lugs and the check rein hook provided on the upper surface of its base portion with an upwardly extended lug having side recesses and on the side edges of its base portion with laterally projecting notches for interlocking with the lugs of the saddle tree, substantially as described.

2. The combination of the saddle tree and check rein hook, the saddle tree provided with an approximately T-shaped vertical passage formed with stepped side holding lugs and the check rein hook provided on the upper surface of its base portion with an upwardly extended lug having side recesses and on the side edges of its base portion with laterally projecting notches for interlocking with the lugs of the saddle tree, and a vertical screw passage through the hook, substantially as described.

3. The combination of a saddle tree, check rein hook and saddle, the saddle tree formed with an approximately T shaped vertical passage having side holding lugs, the hook formed with side grooves and lugs for interlocking with the lugs on the saddle tree, and the saddle formed with a lug which enters the vertical passage of the saddle tree, and means for securing the saddle to the saddle tree, substantially as described.

In testimony whereof I hereunto affix my signature in presence of two witnesses.

WILLIS S. LUND.

Witnesses:
R. T. SMITH,
L. A. SMITH.